United States Patent
Lim et al.

(10) Patent No.: US 10,623,816 B2
(45) Date of Patent: Apr. 14, 2020

(54) METHOD AND APPARATUS FOR EXTRACTING VIDEO FROM HIGH RESOLUTION VIDEO

(71) Applicant: SK TELECOM CO., LTD., Seoul (KR)

(72) Inventors: Jeong-yeon Lim, Seoul (KR); Dongbum Seo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 92 days.

(21) Appl. No.: 15/858,376

(22) Filed: Dec. 29, 2017

(65) Prior Publication Data

US 2018/0124462 A1 May 3, 2018

Related U.S. Application Data (63) Continuation of application No. PCT/KR2016/007209, filed on Jul. 4, 2016.

(30) Foreign Application Priority Data

Jul. 3, 2015 (KR) .................. 10-2015-0095470
Jul. 4, 2016 (KR) .................. 10-2016-0084443

(51) Int. Cl.
*H04N 9/804* (2006.01)
*H04N 19/59* (2014.01)
(Continued)

(52) U.S. Cl.
CPC ....... *H04N 21/4621* (2013.01); *H04N 9/8047* (2013.01); *H04N 19/59* (2014.11); *H04N 21/440245* (2013.01); *H04N 7/0125* (2013.01)

(58) Field of Classification Search
CPC ....... H04N 21/2343; H04N 21/234345; H04N 21/23439; H04N 21/2356; H04N 21/2358
(Continued)

(56) References Cited

U.S. PATENT DOCUMENTS

2016/0165309 A1* 6/2016 Van Brandenburg ................. H04N 21/4728
725/116

FOREIGN PATENT DOCUMENTS

KR 10-1053161 B1 8/2011
KR 10-1108888 B1 1/2012
(Continued)

OTHER PUBLICATIONS

International Search Report for PCT/KR2016/007209 dated Oct. 6, 2016.
(Continued)

*Primary Examiner* — Dominic D Saltarelli
(74) *Attorney, Agent, or Firm* — Hauptman Ham, LLP (57) ABSTRACT

An apparatus for and a method of extracting a video segment from a multiplexed video are disclosed. According to some aspects of the disclosed embodiment, an apparatus, service and method for video selection/extraction are provided for when a service provider delivers a video sized greater than the screen of a user-owned device without a separate conversion, in order to extract predefined video areas in real time from the user device for a customized display on the device display screen, or extract from a network gateway or streaming server in real time the predefined video areas for a customized delivery to meet the specification of the terminal that ordered the video segment, or upon receiving user's navigated and selected video location from the terminal, extract the video segment and enlarge specified location and provides multifaceted viewing experiences for the user.

10 Claims, 7 Drawing Sheets

118, 142, 170, 174

(51) Int. Cl.
*H04N 21/44* (2011.01)
*H04N 21/462* (2011.01)
*H04N 21/4402* (2011.01)
*H04N 7/01* (2006.01)

(58) Field of Classification Search
USPC .................................................. 725/90, 116
See application file for complete search history.

(56) References Cited

FOREIGN PATENT DOCUMENTS

| | | |
|---|---|---|
| KR | 10-2014-0016357 A | 2/2014 |
| KR | 10-1446074 B1 | 10/2014 |
| KR | 10-1516020 B1 | 5/2015 |
| WO | 2012-168365 A1 | 12/2012 |
| WO | 2014-111547 A1 | 7/2014 |
| WO | 2015-014773 A1 | 2/2015 |
| WO | 2015/056941 A1 | 4/2015 |

OTHER PUBLICATIONS

ITU-T H.265 Series H: Audiovisual and Multimedia Systems Infrastructure of audiovisual services—Coding of moving video, Telecommunication Standardization Sector of ITU, Apr. 2013, printed in Switzerland, Geneva.

Korean Office Action dated Nov. 15, 2019, in connection with the Korean Patent Application No. 10-2016-0084443.

* cited by examiner

|     |     |     |     |     |     |     |     |     |     |     |     |
|-----|-----|-----|-----|-----|-----|-----|-----|-----|-----|-----|-----|
| 0   | 1   | 2   | 3   | 12  | 13  | 14  | 21  | 22  | 23  | 24  |     |
| 4   | 5   | 6   | 7   | 15  | 16  | 17  | 25  | 26  | 27  | 28  |     |
| 8   | 9   | 10  | 11  | 18  | 19  | 20  | 29  | 30  | 31  | 32  |     |
| 33  | 34  | 35  | 36  | 41  | 42  | 43  | 47  | 48  | 49  | 50  |     |
| 37  | 38  | 39  | 40  | 44  | 45  | 46  | 51  | 52  | 53  | 54  |     |
| 55  | 56  | 57  | 58  | 63  | 64  | 65  | 69  | 70  | 71  | 72  |     |
| 59  | 60  | 61  | 62  | 66  | 67  | 68  | 73  | 74  | 75  | 76  |     |

METHOD AND APPARATUS FOR EXTRACTING VIDEO FROM HIGH RESOLUTION VIDEO

CROSS-REFERENCE TO RELATED APPLICATION

The present application is a continuation of PCT/KR2016/007209, filed Jul. 4, 2016, which is based on and claims priority to Korean Patent Application Nos. 10-2015-0095470 and 10-2016-0084443, respectively filed on Jul. 3, 2015 and Jul. 4, 2016. The disclosures of above-listed applications are hereby incorporated by reference herein in their entirety.

TECHNICAL FIELD

The present disclosure in some embodiments relates to a method and apparatus for extracting a video segment from a high-resolution video.

BACKGROUND

The statements in this section merely provide background information related to the present disclosure and do not necessarily constitute prior art.

The amount of UHD (Ultra High Definition) content is on the rise in recent years. Moreover, with the increasing resolution of video image content, various attempts have been made to allow viewing of favorite video images such as 360-degree UHD panoramic content in partial enlarged view or in its entirety by utilizing a variety of wearable devices.

The expansion of these UHD content services is leading the constantly increasing resolution of display devices including UHD-capable TVs, yet mobile terminals have been released mostly to support a resolution of QHD (Quad High Definition). Although mobile terminals are capable of supporting the UHD content, content of a full HD or higher resolution as viewed in the mobile terminals exhibits no discernible difference in image quality. In addition, the mobile terminal has a limited screen size and suffers from constraints when reproducing a high-resolution video, such as buffer size limit of the terminal and video quality degradation due to down-sampling.

Content of certain resolutions, in general, is provided to the mobile terminal with the bit rate or the resolution reduced through a real-time transcoder. However, the higher the original video resolution, the harder the content provision by the bit rate reduction alone, which requires a video editing for resolution adjustment before transmitting the content.

Unable to reproduce the content with increasing resolution in its entirety, the existing/legacy terminals (TV, smartphone, computer pad/tablet, monitor, etc.) also need to be provided with the source content pre-edited through the transcoder.

Such requirement exacts a transcoding procedure for decoding and editing the video images provided and then re-encoding the edited images. The transcoding procedure causes deterioration in video quality and data transfer delay among other deficiencies to restrict the provision of content and to increase cost associated with reprocessing of the video.

Further, when a headend performs the video reprocessing, the user's option for playing certain video segment is so limited as the resolution is increased. This is detrimental to the intrinsic feature of the UHD quality video that is to allow viewing of a select video segment.

DISCLOSURE

Technical Problem

The present disclosure in some embodiments seeks to provide an apparatus, service and method for video selection/extraction for when a service provider delivers a video sized greater than the screen of a user-owned device without a separate conversion, in order to extract predefined video areas in real time from the user device for a customized display on the device display screen, or extract from a network gateway or streaming server in real time the predefined video areas for a customized delivery to meet the specification of the terminal that ordered the video segment, or upon receiving user's navigated and selected video location from the terminal, extract the video segment and enlarge specified location and provides a multifaceted viewing experience for the user.

SUMMARY

In accordance with some embodiments of the present disclosure, a video extraction apparatus includes a first receiving unit, a second receiving unit, a video information analysis unit, and an extracted bitstream generation unit. The first receiving unit is configured to a video selection information according to a user request, a network environment or a terminal performance. The second receiving unit is configured to receive an entire bitstream having a header information which includes an information indicating one or more tiles in existence as video constituents. The video information analysis unit is configured to analyze video codes and the header information of the entire bitstream received by the second receiving unit. The extracted bitstream generation unit is configured to generate a new header information with the header information of the entire bitstream modified according to the video selection information received by the first receiving unit, and to generate an extracted bitstream including the new header information and video codes corresponding to the video selection information.

According to another embodiment of the present disclosure, a video extraction method includes receiving a video selection information and an entire bitstream having a header information which includes an information indicating one or more tiles in existence as video constituents, analyzing video codes and the header information of the entire bitstream, generating a new header information with the header information of the entire bitstream modified according to the video selection information, and generating an extracted bitstream including the new header information and video codes corresponding to the video selection information.

According to yet another embodiment of the present disclosure, a bitstream generation apparatus includes a receiving unit, an encoding unit, and a terminal. The receiving unit is configured to receive a content including a video. The encoding unit is configured to analyze the video included in the content, to set the video to have one or more tiles in pictures as constituents by a size and a number depending on a composition of the video, a size of the video, and a terminal for receiving the video, and to encode the set video.

According to yet another embodiment of the present disclosure, a video extracting terminal device includes a communication unit, a display unit, a user input unit, a video extraction unit, and a decoder. The communication unit is configured to receive at least one of an entire bitstream having a header information which includes an information indicating one or more tiles in existence as video constituents, or an entire bitstream information about the entire bitstream. The display unit is configured to display the entire bitstream information. The user input unit is configured to generate a video selection information which informs about an object or an area of choice by a user out of the entire bitstream displayed by the display unit. The video extraction unit is configured to analyze video codes and the header information of the entire bitstream, to generate a new header information with the header information of the entire bitstream modified according to the video selection information, and to generate an extracted bitstream including the new header information and a video information of the tiles corresponding to the video selection information. The decoder is configured to decode the extracted bitstream.

Advantageous Effects

As explained above, according to one aspect of this embodiment, once selected by a user navigating through ultra-high-definition content in at least UHD resolution, a select video segment for viewing is extracted, thereby allowing a terminal to display the extracted video segment in enlarged view.

According to another aspect of this embodiment, in extracting a user's select video segment from content in at least UHD resolution or in controlling the video traffic according to the network environment, performance of the terminal and the like, the video segment extraction is performed with a header changed requiring no separate transcoding, thereby resolving issues of retardation due to the time required for the transcoding process and the accompanied image quality degradation, while enabling a user's own private selection and extraction of a video segment, resulting in the user's preferences reflected immediately in the visual effect.

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

Figure 1A:
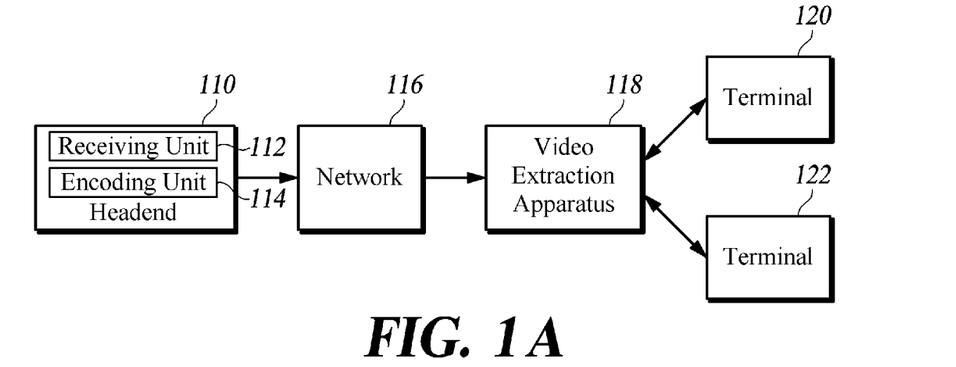
FIG. 1A is a schematic diagram of a video extraction apparatus linked to with user terminals via a network, according to at least one embodiment of the present disclosure.

FIG. 1A is a schematic diagram of a video extraction apparatus linked with user terminals via a network, according to at least one embodiment of the present disclosure.

A headend 110 is adapted to encode a content stored in a camera, a real time channel or storage into a structure having a plurality of tiles, and transmits the entire encoded stream through a network 116 to the video extraction apparatus 118. The headend 110 may be configured to include a receiving unit 112 and an encoding unit 114.

The headend receiving unit 112 receives and transfers the content stored in the camera, real-time channel and storage to the encoding unit.

The headend encoding unit 114 encodes the entire bitstream, and sets the tile size and the number of tiles in a picture during encoding. At this time, the encoding unit 114 may appropriately set the number of tiles in the picture, the size of the tiles, and position of the tiles, etc. depending on the video/scene composition, the video size, the terminal to be served or the like. For example, if the entire stream has a resolution of 7680×4320 pixels, the encoding unit 114 extracts such tile areas that can be viewed at 3840×2160 resolution on a screen supportive of 7680×4320 resolution so that the video can be viewed smoothly even in a TV set that provides the resolution of 3840×2160. The encoding unit 114, after extracting the tile areas, may cause the extracted areas to be exclusively reconstructed by setting the tile to the 3840×2160 resolution or by setting a plurality of tiles of sizes smaller than 3840×2160 during encoding.

Accordingly, the header information of the entire bitstream encoded by the encoding unit 114 includes information indicating that each displayed picture is composed of a multi-tile structure. In addition, the header information includes flag information representing the use of the tile structure in the picture and information on the numbers of horizontal tiles and vertical tiles.

Figure 2:
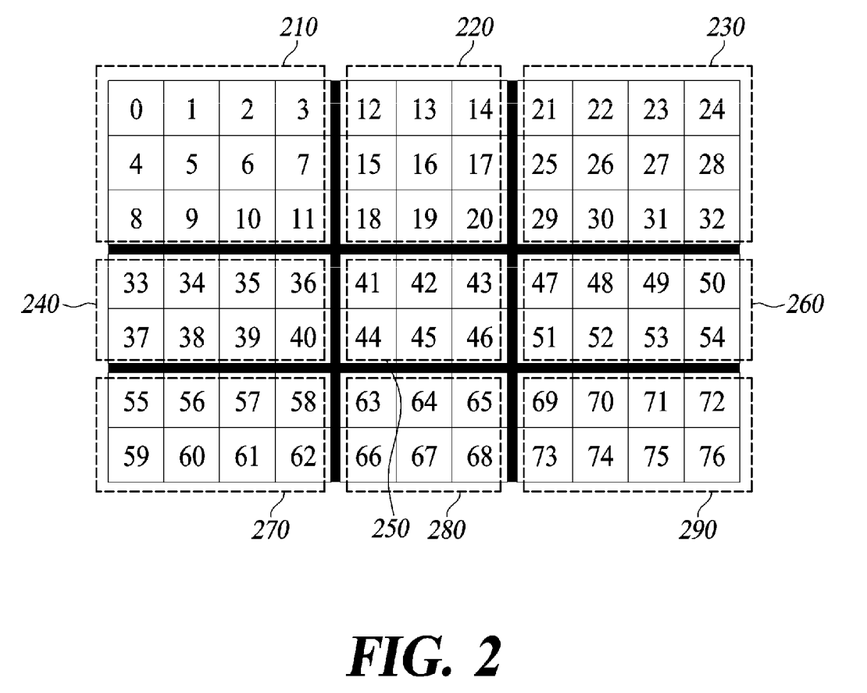
FIG. 2 is a schematic diagram of a displayed image segmented into tile structure of three rows and three columns.

FIG. 2 is a schematic diagram of a displayed image segmented into tile structure of three rows and three columns.

As described above, the headend encoding unit 114 sets, with respect to a single entire bitstream, the number of the tiles or the size of the tiles depending on the video/scene composition, the video size, the terminal to be served or the like.

As illustrated in FIG. 2, a single displayed image may be set to have three horizontal tiles and three vertical tiles, and each tile has its the number of CTBs (Coding Tree Blocks), i.e., unit of coding determined.

Referring to FIG. 2, a tile in the displayed image has widthwise samples equally numbered by a vertically adjacent tile's widthwise samples. In addition, a tile has heightwise samples equally numbered by a horizontally adjacent tile's heightwise samples.

For example, the tiles 210, 240 and 270 are set to have the same number of horizontal samples. In addition, the tiles 210, 220 and 230 are set to have the same number of vertical samples. In this setting, a tile structure by H.265 HEVC (High Efficiency Video Coding) is made applicable.

Encoding unit 114 encodes the entire bitstream and grasps information on the entire bitstream. The entire bitstream information refers to information that can represent the whole bitstream, and the term entire bitstream information encompasses the idea of a thumbnail image of the entire bitstream, a thumbnail video, a portion of the image of the entire bitstream, a portion of the video of the entire bitstream, the complete bitstream scenes or a text representing appearance of objects, and the like.

In addition, the headend encoding unit 114 may transfer positional information of a tile where a predetermined object is located, as additional information to an encoded stream. This enables the terminals 120, 122 to track the movement of a predetermined object in action within the video for a viewer to select that object for viewing. The predetermined object may be set, for example, in a sports related video, to a specific player, coach, cheerleader or the like. After determining the area where a predetermined object is located, the encoding unit 114 may set the tiles into various sizes by resizing the tiles to fit the object for allowing the predetermined object to be better extracted or by downsizing the tiles for allowing the predetermined object to be intact in shape and extracted well. The encoding unit 114 may transmit the positional information of at least one tile of the area to be extracted after muxing the positional information and the whole video stream to the video extraction apparatus 118. At this time, the area at the location of the predetermined object may have the tile size and number thereof preset for each of different resolutions so that the relevant area is extracted depending on the resolution of a terminal. For example, where a stream to be encoded by the headend has 3840×2160 resolution for transmission to the video extraction apparatus while the terminal provides a resolution of 1920×1080, the encoding unit 114 may transmit the 3840×2160-resolution stream along with the tile size and number set to 1920×1080 or lower resolution as additional information.

The video extraction apparatus 118 receives the entire bitstream and the entire bitstream information from the headend 110 through the network 116, and transmit the entire bitstream information to the terminals 120, 122. The video extraction apparatus 118 may be functionally incorporated in home gateway. The video extraction apparatus 118 receives, from the terminals 120 and 122, terminal information and video selection information. The video selection information refers to information about the location of an area desired to be enlarged or about a particular object desired to be motion-tracked in the video. The video selection information may be obtained from an input by a predetermined selection device such as a touch screen, remote control, mouse or keyboard, or obtained by using an eye-tracking device and the like that is capable of determining the user's ROI (Region of Interest) through determining the position to which the user's line of sight is directed. For example, the object location information may be the coordinate position of an image or an object ID predefined through a UI (user interface). The video extraction apparatus 118 may determine the dividable size of the tiles by utilizing the terminal information including maximum terminal resolution and the designated coordinate. If the tile corresponding to the designated coordinate equals to the terminal resolution supported, the video extraction apparatus 118 may choose a single tile. If the relevant tile is set so small with a plurality of tiles being selectable in the terminal, the video extraction apparatus 118 may select the relevant tile along with its surrounding tiles and thereby determine the desired select location. In response to a viewer simultaneously selecting more than one specific region (player, actor, director, etc.) from the whole of the video or a plurality of channels, the video extraction apparatus 118 may selectively extract the relevant tiles alone and recombine the same. The video extraction apparatus 118 uses the video selection information for extracting the video tile portion corresponding to the video selection information in the entire bitstream. The video extraction apparatus 118 sends the terminals 120, 122 the extracted video with the header changed according to the size of the extracted video without a separate transcoding. This will be described in detail with reference to FIG. 3.

The terminals 120, 122 receive the entire bitstream information from the video extraction apparatus 118, and transmit the terminal information and the video selection information to the video extraction apparatus 120. The terminals 120, 122 each may be a personal computer (PC), laptop, tablet, portable information terminal (personal digital assistant or PDA), game console, portable multimedia player (PMP), PlayStation Portable (PSP), wireless communication terminal, smart phone, TV, set-top box, media player or such a user terminal. The terminal information identifies the relevant terminal the user terminals as described above.

Figure 1B:
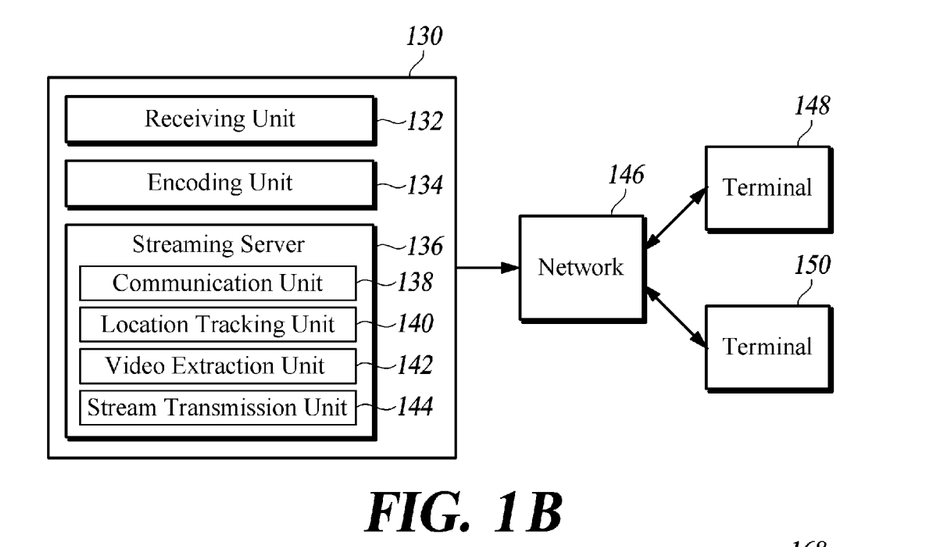
FIG. 1B is a schematic diagram of a transmission of extracted stream to user terminals via a network, according to another embodiment of the present disclosure.

FIG. 1B is a schematic diagram of a transmission of extracted stream to user terminals via a network, according to another embodiment of the present disclosure.

A headend 130 encodes an entire bitstream into a multi-tile structure, and transmits an entire bitstream information by using a streaming server 136 to terminals 148 and 150. In addition, the headend 130 receives a video selection information from the terminals 148, 150, and generates, from the entire bitstream, an extracted bitstream for a predetermined area or object corresponding to the video selection information. The headend 130 may be configured to include a receiving unit 132, an encoding unit 134 and a streaming server 136.

The receiving unit 132 performs the same operation as the receiving unit 112 illustrated in FIG. 1A.

The encoding unit 134 encodes the entire bitstream, and determines the tile size and the number of tiles in a picture during encoding. At this time, the encoding unit 134 may preset the tile size, the number of tiles in pictures and the like, in accordance with information obtained by analyzing the video, which are composition information of the objects in the scenes, areas of significance in the video, terminal performance, and network environment. Accordingly, the encoding unit 134 may utilize the location information of the preset area or object for allowing a segment of the entire bitstream to be played on the user terminal. For example, if the entire stream has a resolution of 7680×4320 pixels, the encoding unit 134 provides the tile sections at or below 3840×2160-tile resolution within a screen supportive of 7680×4320 resolution so that the video can be viewed smoothly even in a TV set that provides the resolution of 3840×2160. In particular, the encoding unit 134 may center the extraction of the user's desired area about the midpoint of a screen image of significance, an important figure in a scene or the like, when providing the tile sections at or below 3840×2160-tile resolution within the screen supportive of 7680×4320 resolution. Thereafter, the encoding unit 134 extracts one or more tiles, sets the tiles to be appropriately viewed with the relevant TV resolution, and then encodes the set tiles along with the tile information. In addition, the encoding unit 114 encodes the entire bitstream, and grasps the entire bitstream information.

The streaming server 136 transmits the entire bitstream information to the terminals 148, 150, receives the terminal information and a video selection information, and generates generate the extracted bitstream of a predetermined area or object corresponding to the video selection information in the entire bitstream. The streaming server 136 may be configured to include a communication unit 138, a location tracking unit 140, a video extraction unit 142 and a stream transmission unit 144.

The communication unit 138 receives the entire bitstream encoded and an entire bitstream information from the encoding unit 134, and transmits the entire bitstream information to the terminals 148, 150. In addition, the communication unit 138 receives the terminal information and the video selection information from the terminals 148, 150.

The location tracking unit 140 determines the tiles to be extracted by mapping the terminal information received by the communication unit 138, the video selection information and the tile structure that constitutes the video. The location tracking unit 140 may determine the dividable size of the tiles based on the terminal information including maximum terminal resolution and the digitized coordinate. If the tile corresponding to the digitized coordinate equals to the terminal resolution supported, the relevant tile may be singled out. If the relevant tile is below the terminal resolution supported, the relevant tile may be selected along with its surrounding tiles to thereby determine the desired select location. In response to a viewer simultaneously selecting multiple specific regions (player, actor, director, etc.) from the whole of the video or a plurality of channels, the location tracking unit 140 delivers tile information (e.g., tile ID) that needs to be extracted to the video extraction unit 142 so that the latter may selectively extract the relevant tiles alone and recombine the same.

The video extraction unit 142 receives the entire stream from the communication unit 138, and receives, from the location tracking unit 140, the tile information that needs to be extracted. The video extraction unit 142 sends the stream transmission unit 144 the extracted video with the header changed according to the size of the extracted video without a separate transcoding. This will be described in detail with reference to FIG. 3.

The stream transmission unit 144 receives the extracted video delivered from the video extraction unit 142, and transmits the same to the terminals. Methods for transmitting a stream may be roughly classified into a push mode in which the streaming server sends the stream to the terminal, and a pull mode in which HTTP (hyper-text transfer protocol) and the like is used for the terminal to request for and bring the stream from the streaming server. The push mode is for a server to transmit packets by using RTP (real time protocol), UDP (user datagram protocol) and the like, and it is used by the existing broadcasting system for packet transmissions regardless of the terminal and network environments. The pull mode, in which the server requests a certain bitstream to the server, includes HLS (HTTP Live Streaming), MPEG-DASH (Dynamic Adaptive Streaming over HTTP), and it is mainly used by Internet broadcasting services requiring traffic control according to mobile IPTV or such network and terminal environments. In case of transmitting a stream in the pull mode, the streaming server transfers media presentation description (MPD) information to the terminal, which, after looking at the media representation description information, requests for (or gets) a bitstream. The media representation description information includes information on the bitstream that the terminal requests the streaming server 136 for, and the specific structure therefor will be described with reference to FIG. 7.

Figure 7:
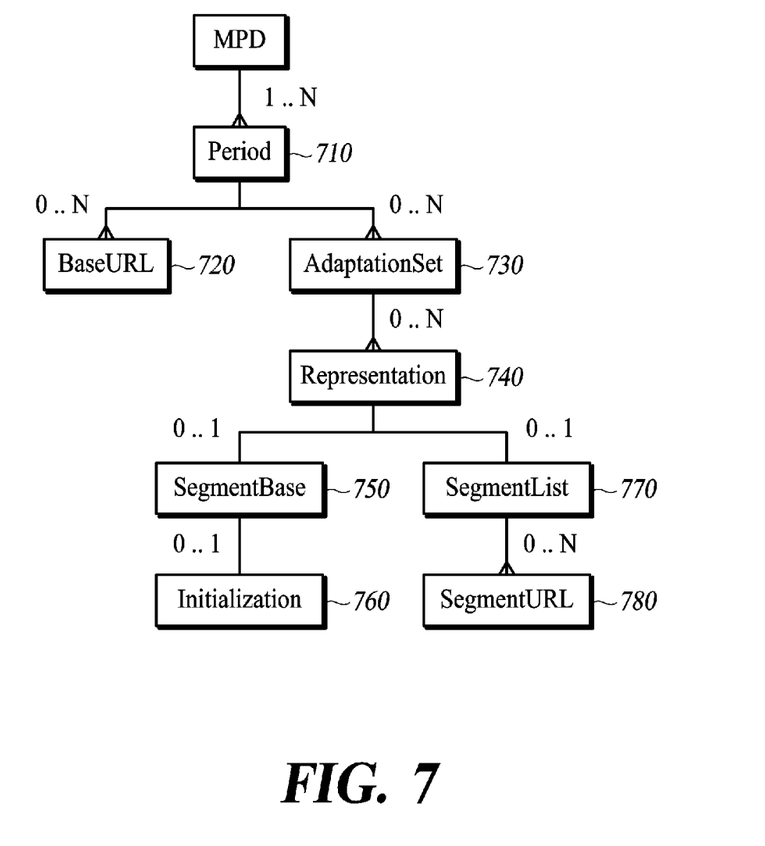
FIG. 7 is a diagram of a structure of a media representation description information according to another embodiment of the present disclosure.

If a service is offered in the pull mode, the video selection information may be defined by using a media representation description information. To describe one content with the encoded stream at different bit rates, conventional media representation description information have used the ID and URL information of the individual streams as AdaptationSet 730 or Representation 740. In order to express specific objects or areas in the same manner, the media representation description information may have the ID and the URL discretely defined for the corresponding specific object or area. The location of the object in the video/scene is determined by the location tracking unit 140 using a variety of tracking technologies. When the video extraction unit 142 extracts a specific object or area based on the information on the tiles to be extracted, the stream transmission unit 144 transmits an extracted stream which is newly generated after being extracted as SegmentURL within AdaptationSet defined by the specific object or area.

Figure 1C:
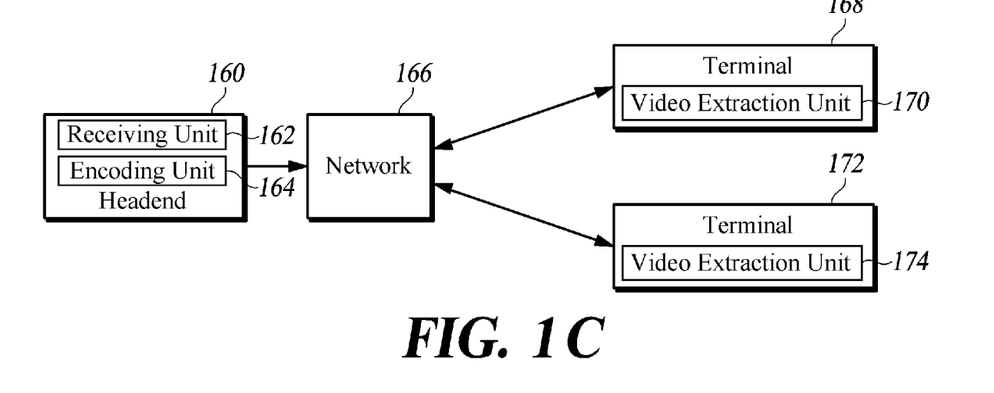
FIG. 1C is a schematic diagram of a transmission of extracted stream to user terminals via a network, according to yet another embodiment of the present disclosure.

FIG. 1C is a schematic diagram of a transmission of extracted stream to user terminals via a network, according to yet another embodiment of the present disclosure.

The headend 160 performs the same operation as the headend 110 illustrated in FIG. 1A.

The terminals 168, 172 each incorporates the video extraction apparatus 118 shown in FIG. 1A. The terminals 168, 172 receive the entire bitstream and the entire bitstream information from the headend 160, and utilize the entire bitstream information to receive the video selection information from users. Video extraction apparatuses 170, 174 which are respectively incorporated in the terminals 168, 172 generate, among the entire bitstream, extracted bitstreams for predetermined areas or objects corresponding to the video selection information. The terminals 168, 172 display the videos extracted by using the extracted bitstreams. Description of the video extraction apparatuses 170, 174 will be presented with reference to FIG. 3.

Figure 3:
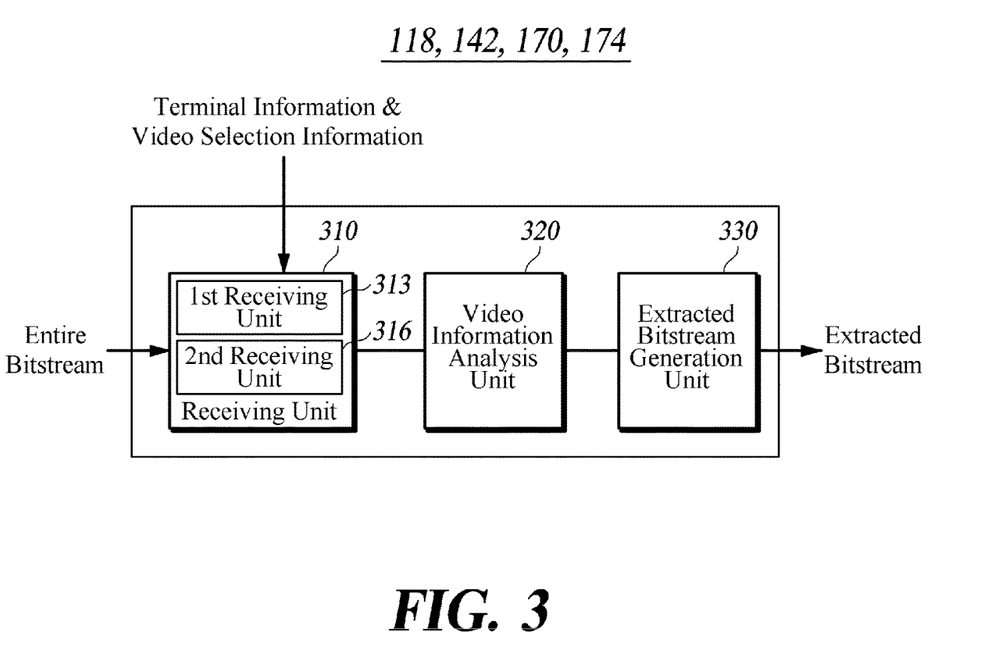
FIG. 3 is a block diagram of a configuration of a video extraction apparatus or a video extraction unit according to at least one embodiment of the present disclosure.

FIG. 3 is a block diagram of a configuration of a video extraction apparatus or a video extraction unit according to at least one embodiment of the present disclosure.

Referring to FIG. 3, the video extraction apparatuses 118, 170, 174, or the video extraction unit 142 according to some embodiments of the present disclosure may each be implemented including a receiving unit 310, a video information analysis unit 320 and an extracted bitstream generating unit 330.

The receiving unit 310 receives the entire bitstream, a terminal information and a video selection information. In this case, the receiving unit 310 may receive the entire bitstream muxed along with an area of a predetermined object from the headend 110 or 160. The receiving unit 310 may include a first receiving unit 313 for receiving a video selection information from the terminals 120, 122, the location tracking unit 140 or a user input unit 550 within the terminals. The receiving unit 310 may include a second receiving unit 316 for receiving the entire bitstream or an information muxed therewith on the area of the predetermined object from the headend 110 or 160 or the communication unit 138. Conversely, the first receiving unit 313 may receive the entire bitstream or an information muxed therewith on the area of the predetermined object, and the second receiving unit 316 may receive the video selection information. The receiving unit 310 may receive information on tiles that need to be extracted from the location tracking unit 140, as the video selection information.

The video information analysis unit 320 receives the entire bitstream from the receiving unit 310, and analyzes, from the entire bitstream, the video information including the video codes and header information. The entire bitstream is obtained by encoding the video, wherein a unit picture of the entire bitstream may be composed of one or more slices, each slice being generated in a structure having one or more tiles.

The slice and tile structures are rectangular structures each including a plurality of coding blocks (coding tree blocks or CTBs) as well as data structures for encoding and decoding by H.265 HEVC (High Efficiency Video Coding). Each tile structure is a matrix form of CTBs. For example, one of the tile structures may be, but not limited to, a matrix form of 3×3 CTBs, although there are envisioned, of course, various other sizes of CTB matrices.

The video codes refer to NAL (Network Abstract Layer) having the actual video coding stream (VCL: Video Coding Layer), and the header information includes NVCL (Non Video Coding Layer) containing information on, for example, the number of slices, the number of tiles for each slice, each tile size, the number of the pixel samples of a picture, and the like.

The extracted bitstream generation unit 330 receives the video selection information from the receiving unit 310, and generates the extracted bitstream based on the video selection information. Or, the extracted bitstream generation unit 330 may identify the tile information corresponding to the information on the area of the predetermined object, received from the receiving unit 310, and generate the extracted bitstream based on the information of the identified tile information.

More specifically, the extracted bitstream generation unit 330 generates an extracted header information, with the header information in the entire bitstream from the video information analysis unit 320 modified to correspond to the bitstream of the tile area to be extracted, based on the video selection information or the information on the area of the predetermined object.

The extracted bitstream generation unit generates an extracted bitstream which includes the modified extracted header information and the video codes which correspond to the video selection information or the information on the area of the predetermined object.

Here, the header of the generated extracted bitstream includes information indicating the entire size of the extracted video and the total number of tiles constituting the extracted video. If the extracted video is constituted by a single tile, the header of the extracted bitstream includes information on the size of the video to be extracted and information on which one of the plurality of slices in the displayed picture is the first slice. If the extracted video is constituted by a plurality of tiles, the header of the extracted bitstream includes information on the total number of tiles present in the extracted video, information on the size of the entire tiles, and information on which one of the plurality of slices in the displayed picture is the first slice.

Figure 4:
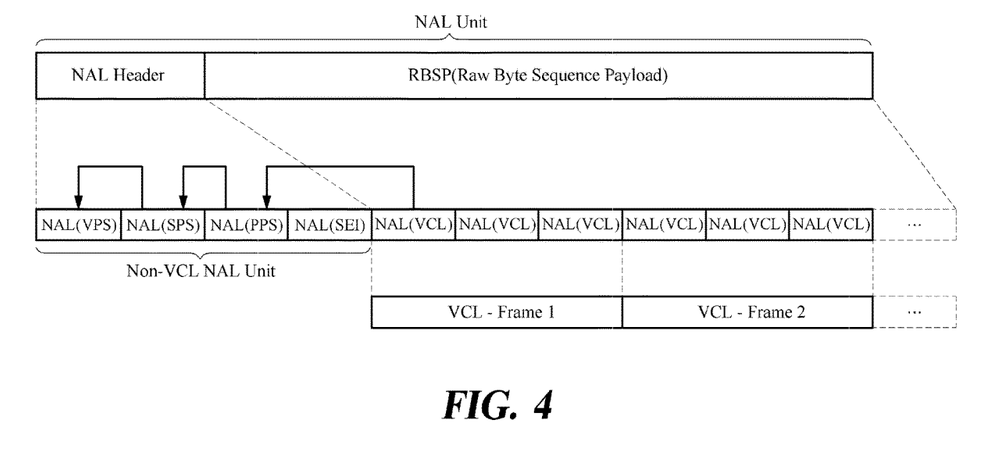
FIG. 4 is a schematic view of a structure of a NAL unit according to at least one embodiment of the present disclosure.

FIG. 4 is a schematic view of a structure of a NAL (Network Abstract Layer) unit according to at least one embodiment of the present disclosure.

Incidentally, the arrows in FIG. 4 illustrate a reference relationship. Referring to FIG. 4, the NAL unit is composed of a NAL header and an RBSP (Raw Bytes Sequence Payload).

The entire bitstream of the encoded video is transmitted to the NAL unit. The NAL header of the NAL unit is composed of a Non-VCL (Non-Video Coding Unit) NAL unit and a VCL NAL unit. The Non-VCL NAL unit is composed of a NAL(VPS) meaning a VPS (Video parameter Set) NAL, a NAL(SPS) meaning an SPS (Sequence Parameter Set) NAL, a NAL(PPS) meaning a PPS (Picture Parameter Set) NAL, and a NAL(SEI) meaning a SEI (Supplemental Enhancement Information) NAL. In particular, the SPS includes on/off information of an encoding tool, and the PPS includes information related to the tiles.

To ensure that video images are processed corresponding to the bitstream extracted in accordance with the specifications of the terminal, the extracted bitstream generation unit 330 generates an extracted bitstream of the video through image tiling with the SPS and PPS information of the NAL header changed.

The VCL NAL unit may include a plurality of frames such as a first frame (Frame 1) and a second frame (Frame 2). Each frame includes three consecutive NAL(VCL)s.

Information about the tiles in the extracted bitstream is set at the PPS. For example, tiles_enabled_flag, which is information to be set at the PPS, informs whether a tile structure is present in the picture.

In the extracted bitstream, the size of each tile is set by num_tile_columns_minus1, num_tile_rows_minus1, and uniform_spacing_flag.

num_tile_columns_minus1 represents the number of horizontal tiles in the extracted bitstream, and num_tile_rows_minus1 indicates the number of vertical tiles in the extracted bitstream. uniform_spacing_flag is information indicating whether the tiles are of the same size.

With reference to the num_tile_columns_minus1 and num_tile_rows_minus1 information, the size uniformity of all the tiles can be determined. If the tiles are not of the same size, each horizontal tile size is set by column_width_minus1 [i], and each vertical tile size is set by row_height_minus1 [i].

On the other hand, there are some limitations to generating the extracted bitstream from the entire bitstream.

At the time of encoding the entire bitstream, the header information of the entire bitstream comes to include information (for example, loop_filter_across_tiles_enabled_flag=0) indicating that the loop filter cannot be performed across the boundaries of the slice. When the extracted bitstream is generated from an encoded entire bitstream under this limitation, no loop filtering does occur, to thereby prevent the deterioration of video quality at the tile boundaries.

At the time of encoding the entire bitstream, the header information of the entire bitstream comes to include, where a motion vector coding mode is set to be merge, mergeskip and the like in the unit of prediction, information indicating that the motion vector cannot reference the padding portion exceeding the range of a video in the extracted bitstream. This prevents motion information from being referenced beyond the boundaries of the tiles for the purpose of designating into a motion vector candidate when the motion vector is calculated in such a mode as merge or mergeskip.

When encoding the entire bitstream, the header information of the entire bitstream includes, where motion estimation is performed in prediction unit, information indicating that the range of motion estimation cannot go beyond the padding portion. This presents the motion prediction from being performed beyond the tile boundary when the extracted bitstream is decoded.

Additionally, when encoding the entire bitstream, the header information of the entire bitstream includes, where the motion vector is encoded in the unit of prediction, information indicating that no reference can be made to a different colocated picture's motion vector (temporal motion vector) at the currently encoded block in the unit of prediction.

When the extracted bitstream generating unit 330 generates SPS, PPS, and slice header information and others corresponding to the extracted bitstream, PPS, corresponding information to the following are changed different from the header information of the entire bitstream.

First, in case the extracted video is constituted by a single tile, the header information of the extracted bitstream is modified as follows.

The SPS has pic_width_in_luma_samples and pic_height_in_luma_samples changed to the size of the single-tile screen to be extracted, and they are set respectively as the horizontal size and the vertical size of the extracted video.

tiles_enabled_flag in the PPS which indicates information about whether a tile structure is present in the picture, is changed to 0, indicating that the tile structure is not present in the picture.

For the first slice in the extracted header information of the extracted bitstream, first_slice_segment_in_pic_flag is set to 1, and for the remaining slices, first_slice_segment_in_pic_flag is set to zero to mean that they are not the first slice. Further, in all slice headers, num_entry_point_offsets, which signifies a tile offset in the slice, is set to 0.

Next, in case the extracted video is constituted by a plurality of tiles, the header information of the extracted bitstream is modified as follows.

The SPS has pic_width_in_luma_samples and pic_height_in_luma_samples changed to the size of the full-tile screen to be extracted, and they are set respectively as the horizontal size and the vertical size of the extracted video.

num_tile_columns_minus1 and num_tile_rows_minus1 in the PPS are modified from their conventional representations of the number of the longitudinally arranged tiles and the number of the horizontally arranged tiles in the entire bitstream, to match the number of the vertical tiles and the number of horizontal tiles in the extracted bitstream, respectively.

Only the first slice header in the extracted header information of the extracted bitstream includes first_slice_segment_in_pic_flag that informs the identity of the first slice in the picture. In the extracted header information of the extracted bitstream, for the first slice in the extracted entire pictures on the extracted bitstream, first_slice_segment_in_pic_flag is set to 1, and for the remaining slices, first_slice_segment_in_pic_flag is set to zero to mean that they are not the first slice. Further, in all slice headers, num_entry_point_offsets, which signifies a tile offset in the slice, is set to 0.

Figure 5A:
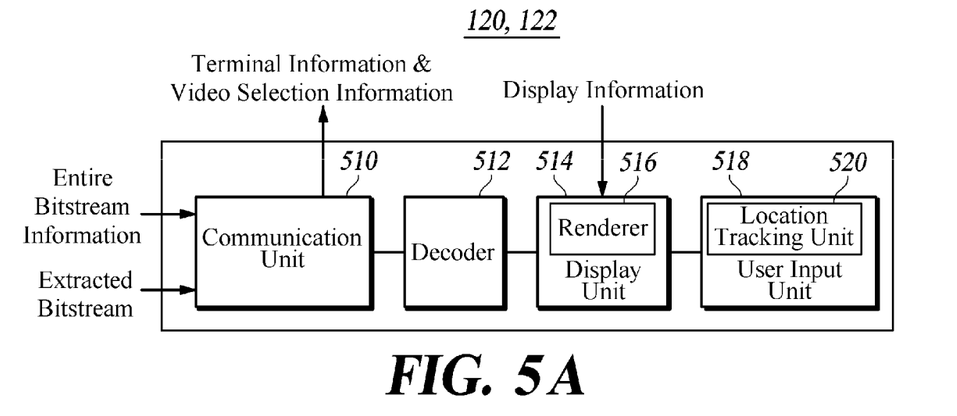
FIG. 5A is a block diagram of a configuration of a terminal according to at least one embodiment of the present disclosure.

FIG. 5A is a block diagram of a configuration of a terminal according to at least one embodiment of the present disclosure.

Referring to FIG. 5A, the terminals 120, 122 according to an exemplary embodiment of the present disclosure may each be implemented including a communication unit 510, a decoder 512, a display unit 514 and a user input unit 518.

The communication unit 510 receives the entire bitstream information from the video extraction apparatus.

The display unit 514 displays the entire bitstream information. The entire bitstream information may be thumbnail images or video of the entire bitstream, may be partial images or a video segment of the entire bitstream, or a text representing the entire bitstream.

The user input unit 518 is supplied by the user with an object or area of choice with respect to the entire bitstream information being displayed by the display unit. The user input unit 518 receives the user's selection of the position of one or more specific objects desired to be motion-tracked or one or more desired areas for viewing. A location tracking unit 520 is provided to digitize information on the position of one or more specific objects desired to be motion-tracked or information on the one or more desired areas for viewing, into coordinates in the stream or such numerical values. According to such digitized information, the location tracking unit 520 tracks the tile information corresponding to the position of an object or an area. Then, the video selection information digitized by the location tracking unit 520 is delivered to the communication unit. The user input unit 518 herein may be a predetermined selection device.

The communication unit 510 receives the video selection information from the user input unit 518, and transmits it to the video extraction apparatus. The communication unit 510 additionally transmits the terminal information to the video extraction apparatus 118.

The communication unit 510 receives the extracted bitstream from the video extraction apparatus 118, and the decoder 512 decodes the extracted bitstream received by the communication unit 510.

The display unit 514 displays the extracted bitstream that is decoded. At this time, a renderer 516 included in the display unit 514 adjusts, based on display information, the tile size of some or all of the plurality of tiles contained in the extracted bitstream. The display information causes, in case the extracted bitstream is constituted by a plurality of tiles, some of the tiles of the extracted bitstream to be enlarged for viewing, and the remaining tiles of the extracted bitstream to be shrunk for viewing. The renderer 516 may adjust the size of each tile of the extracted bitstream based on such display information.

The display unit 514 displays the extracted bitstream resized by the renderer 516.

Figure 5B:
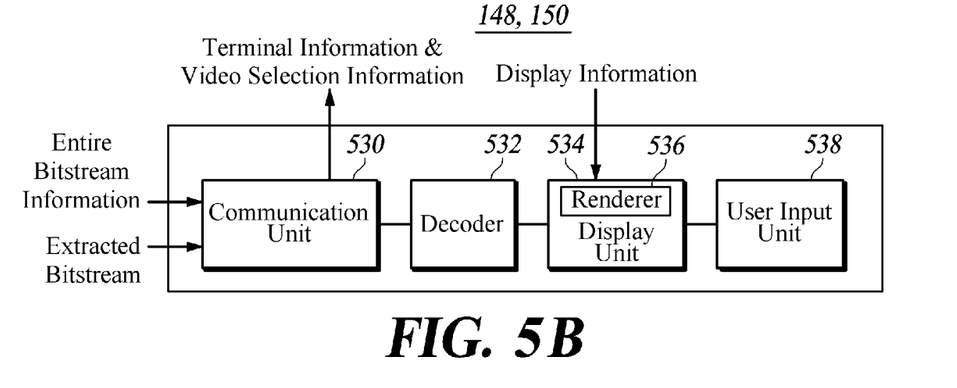
FIG. 5B is a block diagram of a configuration of a terminal according to another embodiment of the present disclosure.

FIG. 5B is a block diagram of a configuration of a terminal according to another embodiment of the present disclosure.

Referring to FIG. 5B, the terminals 148, 150 according to at least one embodiment of the present disclosure may each be implemented including a communication unit 530, a decoder 532, a display unit 534 and a user input unit 538.

The communication unit 530 receives the entire bitstream information from the streaming server 136.

The display unit 514 displays the entire bitstream information. The entire bitstream information may be thumbnail images or video of the entire bitstream, or an image segment or video segment of the entire bitstream, or a text representing the entire bitstream.

The user input unit 538 is supplied by the user with an object or area of choice with respect to the entire bitstream information being displayed by the display unit. The user input unit 538 receives the user's selection of the position of one or more specific objects desired to be motion-tracked or one or more desired areas for viewing. The user input unit 538 is absent of a location tracking unit different from the user input unit 518 illustrated in FIG. 5A, and therefore it operates up to the point of receiving the user's selection of the objects or areas. The user input unit 538 writes the select objects or areas of the user in the media representation narrative information.

The communication unit 530 receives the media representation description information as the video selection information from the user input unit 538, and transmits it to the streaming server 136. The communication unit 530 additionally transmits the terminal information to the streaming server 136.

The communication unit 530 accesses a buffer of the streaming server 136 and requests for the stored extracted bitstream (pull mode), and thereby obtains the extracted bitstream.

The decoder 532 decodes the extracted bitstream obtained, the display unit 534 displays the extracted bitstream decoded. At this time, a renderer 536 included in the display unit adjusts the size of some or all of the plurality of tiles included in the extracted bitstream, based on display information.

Figure 5C:
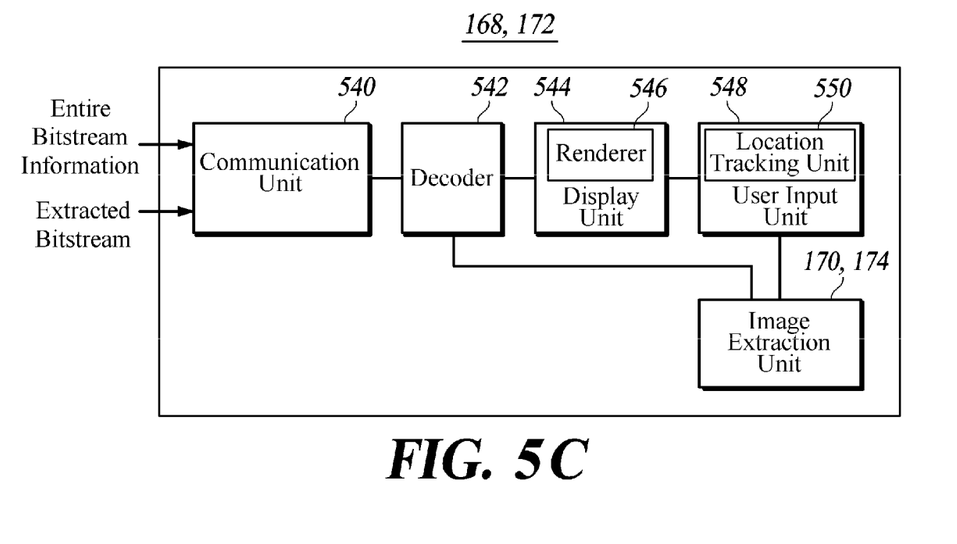
FIG. 5C is a block diagram of a configuration of a terminal according to yet another embodiment of the present disclosure.

FIG. 5C is a block diagram of a configuration of a terminal according to yet another embodiment of the present disclosure. FIG. 5C shows the video extraction units 170, 174 as incorporated in the terminals, respectively.

Referring to FIG. 5C, the terminals 168, 172 according to at least one exemplary embodiment of the present disclosure may each be implemented including a communication unit 540, a decoder 542, a display unit 544, a user input unit 548 and the video extraction units 170, 174.

First, the communication unit 540 receives the entire bitstream and the entire bitstream information from the headend 160.

The display unit 544 displays the entire bitstream information. The entire bitstream information may be thumbnail images or video of the entire bitstream, or an image segment or video segment of the entire bitstream, or a text representing the entire bitstream.

The user input unit 548 is supplied by the user with an object or area of choice with respect to the encoded bitstream being displayed by the display unit 544. The user input unit 548 receives the user's selection of the position of one or more specific objects desired to be motion-tracked or one or more desired areas for viewing. A location tracking unit 550 is provided to digitize information on the position of one or more specific objects desired to be motion-tracked or information on the one or more desired areas for viewing, into coordinates in the stream or such numerical values. According to such digitized information, the location tracking unit 550 tracks the tile information corresponding to the position of an object or an area. Then, the video selection information digitized by the location tracking unit 550 is delivered to the video extraction units 170, 174. The user input unit 548 herein may be a predetermined selection device.

The video extraction units 170, 174 generate the video selection information from the user input unit 548, and generate the extracted bitstream the upon receiving the entire bitstream from the communication unit 540. The relevant operation is equivalent to the above description presented with reference to FIG. 3, and a detailed description thereof will be omitted.

The decoder 542 decodes the extracted bitstream obtained, and the display unit 544 displays the extracted bitstream decoded. At this time, a renderer 546 included in the display unit adjusts the size of some or all of the plurality of tiles included in the extracted bitstream, based on display information received from the video extraction units 170, 174.

Figure 6:
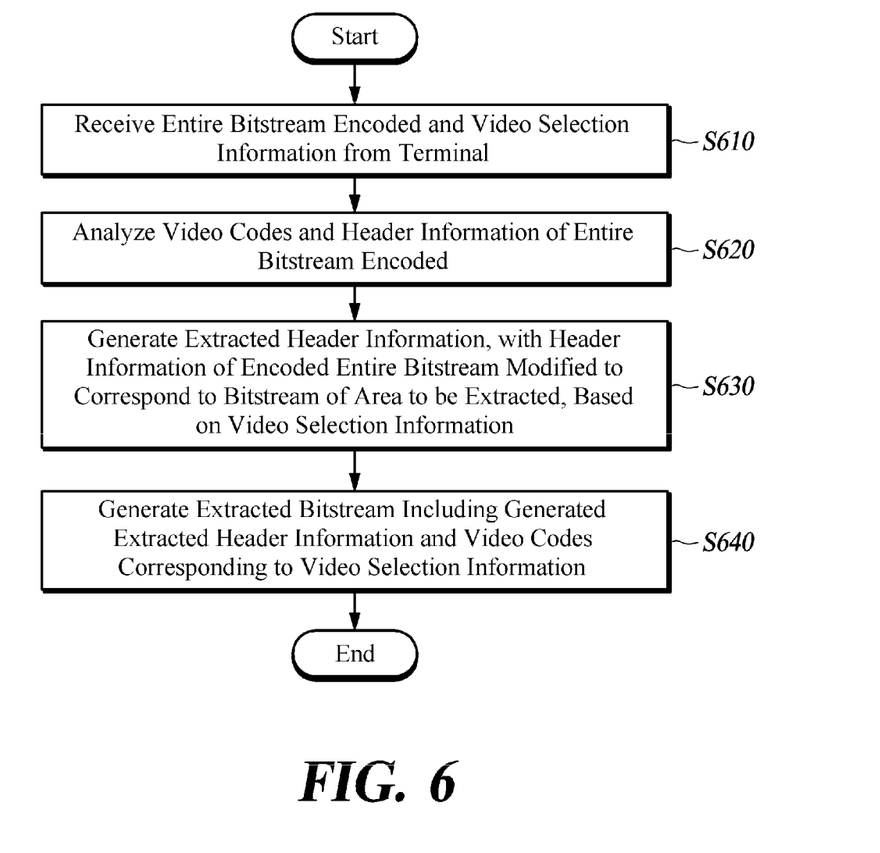
FIG. 6 is a flowchart illustrating a video extraction method according to at least one embodiment of the present disclosure.

FIG. 6 is a flowchart illustrating a video extraction method according to at least one embodiment of the present disclosure.

The video extraction method receives the entire bitstream encoded and a video selection information from a terminal in Step S610.

The video extraction method analyzes video codes and header information of the entire bitstream encoded (S620).

The video extraction method generates extracted header Information, with header information of the encoded entire bitstream modified to correspond to the bitstream of an area to be extracted, based on video selection information (S630).

The video extraction method generates an extracted bitstream including the generated extracted header information and video codes corresponding to the video selection information (S640).

Steps S610 to S640 in FIG. 6 are described to be sequentially performed as a mere example for describing the technical idea of some embodiments, although one of ordinary skill in the pertinent art would appreciate that various modifications, additions and substitutions are possible by performing the sequences shown in FIG. 6 in a different order or at least one of steps S610 to S640 in parallel without departing from the idea and scope of the embodiments, and hence the example shown in FIG. 6 is not limited to the chronological order.

On the other hand, the process steps illustrated in FIG. 6 can be implemented as computer readable codes in a computer readable recording medium. The computer readable recording medium includes all kinds of recording devices storing data that can be read by a computer system. More specifically, the computer readable recording medium includes a storage medium such as a magnetic recording medium (e.g., ROM, floppy disk, hard disk, etc.), an optically readable medium (e.g., CD-ROM, DVD, etc.) and carrier waves (e.g., transmissions over the Internet). Further, the computer-readable recording medium can be distributed in computer systems connected via a network, and computer-readable codes can be stored and executed in a distributed mode.

FIG. 7 is a diagram of a structure of a media representation description information according to another embodiment of the present disclosure.

Period 710 refers to a period of media information is retained.

BaseURL 720 refers to the common URL of the streams to request for.

AdaptationSet 730 is a set of variously encoded resources after being selected by terminals. Period 710 needs at least one AdaptationSet 730 present therein.

Representation 740 shows the encoded version of one or more media streams. Representation 740 is composed of one or more of Segment, and it includes SegmentBase 750 of each Segment constituting the Representation, SegmentList and 770, SegmentURL 780 and others.

When requested for a viewing of a predetermined area or object enlarged, the terminal may forward the request to the streaming server by using AdaptationSet 730 or Representation 740 in the media representation description information. When a user selects a specific object or when a network or a terminal requires its specific control over the traffic, the terminal may forward the selection or requirement to the streaming server 136 by using SegmentURL 780 in the media representation description information.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. A video extraction apparatus, comprising:
    a first receiving unit configured to receive a video selection information according to a user request, a network environment or a terminal performance;
    a second receiving unit configured to receive an entire bitstream having a header information which includes an information indicating that a video is composed of a plurality of tiles;
    a video information analysis unit configured to analyze video codes and the header information of the entire bitstream received by the second receiving unit; and
    an extracted bitstream generation unit configured to select one or more tiles corresponding to the video selection information among the plurality of tiles of the entire bitstream, generate a new header information by modifying the header information of the entire bitstream according to the selected one or more tiles, and generate an extracted bitstream including the new header information and video codes associated with the selected one or more tiles corresponding to the video selection information.

2. The video extraction apparatus of claim 1, wherein the image selection information is received from a source of the entire bitstream or from a terminal for receiving the extracted bitstream.

3. The video extraction apparatus of claim 2, wherein the image selection information, when received from the source of the entire bitstream, includes information on an area where one or more predetermined objects are located.

4. The video extraction apparatus of claim 2, wherein the extracted bitstream generation unit is configured to modify, according to the video selection information, at least one of an SPS (Sequence Parameter Set), a PPS (Picture Parameter Set) or a slice header information which are included in the header of the entire bitstream.

5. The video extraction apparatus of claim 4, wherein the extracted bitstream generation unit is configured to modify, when modifying the SPS among information within the header of the entire bitstream according to the video selection information, a pic_width_in_luma_samples and a pic_height_in_luma_samples into an on-screen size of the tile to be extracted.

6. The video extraction apparatus of claim 4, wherein, when modifying the PPS among information within the header of the entire bitstream according to the video selection information, the extracted bitstream generation unit is configured to modify, a tiles_enabled_flag into 0 in case that a single tile constitutes an extracted video, and modify a num_tile_columns_minus1 and a num_tile_rows_minus1 to respectively match the number of vertically arranged tiles and the number of horizontally arranged tiles in the extracted bitstream in case that a plurality of tiles constitutes the extracted video.

7. The video extraction apparatus of claim 2, wherein the image selection information, when received from the terminal for receiving the extracted bitstream, includes information on at least one area desired to be enlarged or information on a particular object desired to be motion-tracked within an entire video corresponding to the entire bitstream.

8. The video extraction apparatus of claim 1, wherein the new header information includes, when a single tile constitutes an extracted video, at least one of information on a size of the tile to be extracted, on whether a tile structure is present, or on an identity of a first slice.

9. The video extraction apparatus of claim 1, wherein the new header information includes, when a plurality of tiles constitutes an extracted video, at least one of information on a size of entire tiles, on a total number of the tiles, or on an identity of a first slice.

10. A video extracting terminal device, comprising:
    a communication unit configured to receive at least one of an entire bitstream or an entire bitstream information about the entire bitstream, the entire bitstream having a header information which includes an information indicating that a video is composed of a plurality of tiles;
    a display unit configured to display the entire bitstream information;
    a user input unit configured to generate a video selection information for indicating an object or an area which is selected by a user out of the entire bitstream information displayed by the display unit;
    a video extraction unit configured to analyze video codes and the header information of the entire bitstream, select one or more tiles corresponding to the video selection information among the plurality of tiles of the entire bitstream, generate a new header information by modifying the header information of the entire bitstream according to the selected one or more tiles, and generate an extracted bitstream including the new header information and a video information of the selected one or more tiles corresponding to the video selection information; and
    a decoder configured to decode the extracted bitstream.

* * * * *